(12) United States Patent
Allam et al.

(10) Patent No.: US 8,179,316 B2
(45) Date of Patent: May 15, 2012

(54) SET MODE PASSIVE LOCATION IN TOA/TDOA MODES

(75) Inventors: Sébastien Allam, Antony (FR); Emmanuel De Gramont, Paris (FR)

(73) Assignee: Thales, Neuilly sur Seine (FR)

( * ) Notice: Subject to any disclaimer, the term of this patent is extended or adjusted under 35 U.S.C. 154(b) by 179 days.

(21) Appl. No.: 12/519,324

(22) PCT Filed: Dec. 13, 2007

(86) PCT No.: PCT/EP2007/063910
§ 371 (c)(1),
(2), (4) Date: Feb. 8, 2010

(87) PCT Pub. No.: WO2008/071777
PCT Pub. Date: Jun. 19, 2008

(65) Prior Publication Data
US 2010/0141529 A1    Jun. 10, 2010

(30) Foreign Application Priority Data
Dec. 15, 2006  (FR) ...................... 06 10961

(51) Int. Cl.
*G01S 1/24* (2006.01)
(52) U.S. Cl. ...................................... 342/387
(58) Field of Classification Search .................... 342/387
See application file for complete search history.

(56) References Cited

U.S. PATENT DOCUMENTS

| 5,327,144 A | 7/1994 | Stilp et al. |
| 2003/0176196 A1 | 9/2003 | Hall et al. |
| 2005/0148346 A1 | 7/2005 | Maloney et al. |
| 2005/0283503 A1* | 12/2005 | Hancock et al. ............. 707/200 |
| 2006/0187119 A1* | 8/2006 | Hall et al. ..................... 342/387 |

\* cited by examiner

*Primary Examiner* — Harry Liu
(74) *Attorney, Agent, or Firm* — Stroock & Stroock & Lavan LLP (57) ABSTRACT

The present invention addresses the resolving of the problems associated with the passive location of targets in TOA (Time of Arrival) or TDOA (Time Difference of Arrivals) mode. The method of passively locating a target in TOA or TDOA mode implements a meshing (subdivision) into blocks of the space in which the location area is situated. The set of the blocks that form this mesh is analyzed iteratively. On each iteration, each block of interest is subdivided into smaller identical subblocks. A block of interest is, according to the invention, a block including at least one point belonging to the location area being sought for which the shape is to be determined. The iterative process is stopped when the size of the subblocks obtained on the current iteration corresponds to the desired resolution. The invention applies in particular to the 2D or 3D location systems that include TOA and TDOA modes or mixed modes.

9 Claims, 10 Drawing Sheets

SET MODE PASSIVE LOCATION IN TOA/TDOA MODES

CROSS-REFERENCE TO PRIOR APPLICATION

This is a U.S. National Phase Application under 35 U.S.C. §371 of International Application no. PCT/EP2007/063910, filed Dec. 13, 2007, and claims benefit of French Patent Application No. 06/10961, filed Dec. 15, 2006, both of which are incorporated herein. The International Application was published in French on Jun. 19, 2008 as WO 2008/071777 under PCT Article 21 (2).

FIELD OF THE INVENTION

The present invention addresses the resolving of the problems associated with the passive location of targets in TOA (Time Of Arrival) or TDOA (Time Difference Of Arrival) mode.

For TOA, the invention makes it possible to locate any target by analyzing the arrival times, on one and the same receiver, of the waves transmitted by one or more transmitters and reflected by the target.

For TDOA, the invention makes it possible to locate a transmitting target by measuring differences of arrival time of the transmitted wave on a number of receivers that are synchronized and scattered in space.

The present invention relates more particularly (but not exclusively) to the field of passive radars.

By its generic nature, the present invention also addresses all the mode combinations (multiple TOA, multiple TDOA, or even mixed TOA/TDOA).

CONTEXT OF THE INVENTION—PRIOR ART

The basic principle of the passive location methods, whether in TOA or TDOA mode, is to determine the positioning of targets by using the information supplied simultaneously by different information sources.

In TOA mode, or "Time Of Arrival" mode, interest is focused on the signals transmitted by one or more transmitters and the same signals reflected by a target. The measurement, for a given transmitter, of the delay between the forward path (transmitter→receiver) and the reflected path (transmitter→target→receiver) is used to define a location curve (or a surface if the problem is dealt with in 3D) that takes the form of an ellipse or an ellipsoid.

Thus, if a number of transmitters are analyzed simultaneously, and provided that there is the capability to receive the forward and reflected paths, it is possible to determine the position of the target that is sought by determining the mutual points/areas of intersections of the different location curves/surfaces.

In TDOA mode, or "Time Difference Of Arrival" mode, interest is focused on the location of transmitting targets by means of a number of synchronized receivers (at least two), a main receiver and one (or more) secondary receivers. As in the TOA mode, the position of the transmitting target is then determined geometrically from location curves (hyperbolas or hyperboloids) established from the measurements of the delays between the different signals originating from the target and arriving at different instants on each of the receivers.

One of the problems raised by passive location stems from the taking-into-account of the uncertainty of the measurement delivered by the receivers. In practice, to produce an accurate location of the target, it is necessary to know as accurately as possible the location area that is compatible with the uncertainties affecting the measurements. Consequently, the location curves are in reality location areas, each area being situated between two extreme curves, the spacing of which depends on the accuracy of the receivers. That way, the points of intersections of the different location curves ideally obtained by using a number of transmitting sources (TOA mode) or a number of receivers (TDOA mode) are replaced in practice by areas of intersection within which these points are situated.

Then, the search for the location areas that are compatible with the measurements firstly involves the mathematical characterization of said areas followed by the search for them in a space of interest (i.e. the space in which the presence of a target is sought).

The usual methods used to perform this search are generally grid methods which involve finely meshing all the space in which the targets are sought, that is, a space that is vast enough to contain the area of uncertainty and systematically analyzing each mesh to check whether it belongs to the location area. There are also algebraic methods of the least-square type, or even probabilistic methods, the complexity (and therefore the complexity of implementation) of which increases with the number of information sources. Apart from the grid methods, none of these methods provides a way of finely restoring the areas of uncertainties associated with the measurement errors (they give only error ellipses or ellipsoids). In addition, the grid methods require a large computation capability to process each mesh sufficiently quickly and determine the location area sufficiently quickly.

DESCRIPTION OF THE INVENTION

One aim of the invention is to benefit from the advantages of the grid processing operations notably in terms of resolution, yet without suffering the drawbacks thereof.

To this end, the subject of the invention is a method of passively locating a target in TOA or TDOA mode that implements a successive subdivision into blocks of an initial space (in which a target is to be located). The set of blocks is analyzed iteratively. On each iteration, each block of interest is subdivided into smaller identical subblocks. A block of interest is, according to one or more embodiments of the invention, a block in which at least one point belongs to the location area being sought. The iterative process is stopped when the size (resolution) of the subblocks obtained on the current iteration corresponds to the desired resolution.

The set of blocks resulting from this process provides an approximation of the shape of the location area that is sought (if the latter exists in the initial space).

More specifically, its subject is a method of passively locating a target in TOA or TDOA mode implementing a successive subdivision into blocks of an initial space (in which a target is to be located) and a search within each block for the presence of points belonging to the location area being sought. This invention is also characterized by the fact that the subdivision and the search are performed in the form of iterative steps on a selection of candidates blocks, modified on each iteration, so that, on each iteration, the blocks of the selection obtained on completion of the preceding iteration are searched to find the blocks containing at least one point belonging to the location area being sought. The blocks not containing any point are subsequently excluded from the selection, whereas the blocks containing at least one point are re-subdivided into subblocks and replaced in the selection by the duly formed subblocks. The selection obtained on each iteration defines the location area with a resolution that increases on each iteration.

According to one or more embodiments of the invention, the iterations are stopped when the subblocks forming the selection define the location area with the desired resolution.

The method according to one or more embodiments of the invention also includes an initialization step in which a first block $[X_0]$ is defined that corresponds to an "a priori" search space, this block constituting the initial selection.

According to a preferred embodiment, the method according to the invention mainly includes:

an initialization step in which a first block $[X_0]$ is defined that corresponds to an a priori search space and that leads to the formation of an initial list $L_0^0$ formed from the block $[X_0]$, an iterative step including:

subdividing each block $[X_n]$ of the current list $L_0^{i-1}$ into four adjoining subblocks $[X_n^1]$, $[X_n^2]$, $[X_n^3]$ and $[X_n^4]$, searching for and selecting from the duly constituted subblocks those containing at least one point forming part of the location area, updating the current list to obtain a list $L_0^i$ in which:

a) the blocks $[X_n]$ for which no subblock has been selected are deleted, b) the other blocks are replaced by the selected subblock $[X_n^j]$, the iterative step also includes an operation to compare the size $\Delta^{L_0^i(1)}$ of the blocks constituting the list $L_0^i$, the method being stopped when the size $\Delta^{L_0^i(1)}$ is greater than the desired resolution objective $\Delta^{obj}$.

According to this embodiment, a block $[X_n^j]$ is selected if at least one of its points satisfies the criterion defined as follows:

$$-0 \in J([X^j]) \text{ with } J([X^j]) = \left[\frac{[x^j]^2}{[a]^2} + \frac{[y^j]}{[b]^2} - 1\right] \text{ in "TOA 2D" mode,}$$

$$-0 \in J([X^j]) \text{ with } J([X^j]) = \left[\frac{[x^j]^2}{[c]^2} - \frac{[y^j]^2}{[d]^2} - 1\right] \text{ in "TDOA 2D" mode,}$$

$$-0 \in J([X^j]) \text{ with } J([X^j]) =$$

$$\left[\frac{[x^j]^2}{[a]^2} + \frac{[y^j]^2}{[b]^2} + \frac{[z^j]^2}{[b]^2} - 1\right] \text{ in "TOA 3D" mode,}$$

$$-0 \in J([X^j]) \text{ with } J([X^j]) =$$

$$\left[\frac{[x^j]^2}{[c]^2} - \frac{[y^j]^2}{[d]^2} - \frac{[z^j]^2}{[d]^2} - 1\right] \text{ in "TDOA 3D" mode,}$$

The invention relies on the set mode approach used to locate the target. The measurements deriving from the various sensors are modeled by intervals (i.e., they include a bounded error). Knowing these measurements, one or more embodiments of the invention uses an iterative process based on an ad hoc set mode criterion (i.e. dependent on the problem, TOA/TDOA single/multiple sensors) to find and approach with the desired resolution, all the areas of the space that are likely, in light of the measurements, to contain a target. The location is set mode in the sense that one or more embodiments of the invention provides a solution set to the location problem (i.e., a set of target positions guaranteed to contain the true position of the target).

Unlike a grid method, there is no need to mesh all the space, the iterative process used in one or more embodiments of the invention makes it possible to concentrate directly on the regions of interest.

DESCRIPTION OF THE FIGURES

The features and benefits of the invention will be better appreciated from the description that follows, which explains the invention through a particular embodiment taken as a nonlimiting example and based on the appended figures, which represent:

FIG. 1, a typical single-transmitter geometrical configuration for implementing the TOA mode, FIG. 2, a representation of the set of location curves ideally obtained in TOA mode with three transmitting sources, FIG. 3, a typical two-receiver geometrical configuration for implementing the TDOA mode, FIG. 4, a representation of the set of location curves ideally obtained in TDOA mode with three secondary receivers, FIG. 5, the representation of a location area actually obtained in TOA mode with one transmitting source, FIG. 6, the representation of a location area actually obtained in TDOA mode with one receiver, FIG. 7, a theoretical flow diagram of the method according to the invention, FIG. 8, an illustration of the application of the method according to the invention to the TOA 2D mode with a single-transmitter system, FIG. 9, an illustration of the application of the method according to the invention to the TDOA 2D mode with a single secondary receiver system, FIG. 10, an illustration of the application of the method according the invention to the TOA 2D mode with a two-transmitter system, and FIG. 11, an illustration of the application of the method according to the invention to the TDOA 2D mode with a two secondary receivers system.

DETAILED DESCRIPTION

Figure 1:
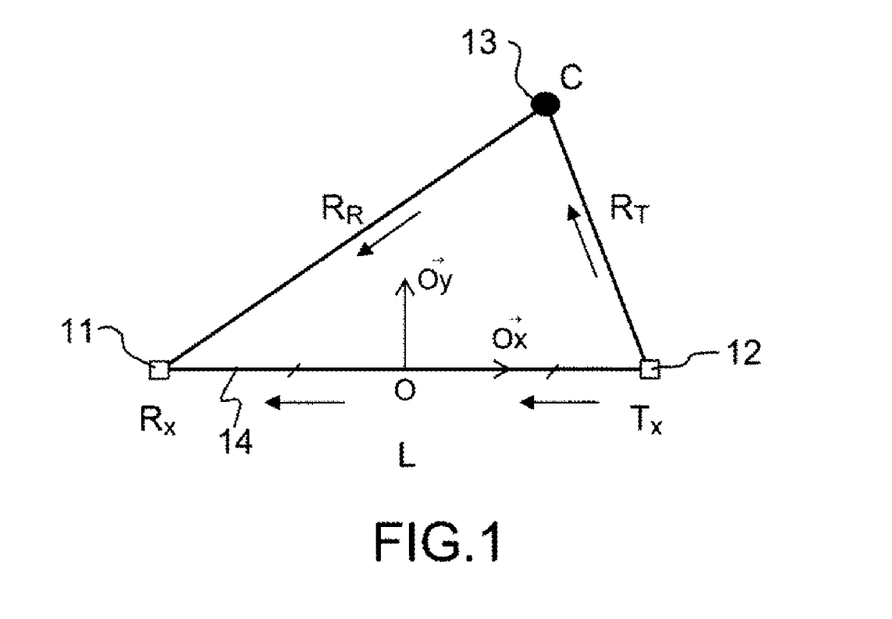

Interest is focused initially on FIG. 1 which schematically shows the ideal operating principle of the TOA location mode. In the interest of clarity of the explanation, the model illustrated here is a two-dimensional model corresponding to the analysis of the signals obtained from a single transmitter (2D single-transmitter model).

As the figure illustrates, this "single transmitter" operating mode involves a transmitting source 12 (transmitter), a receiver 11, and a target 13 that is to be located. To locate the target, the receiver 11 measures the time delay that exists between the received wave originating directly from the transmitter 12 (forward wave), and the received wave originating from the reflection of the wave transmitted by the source 12, on the target 13 that is to be located (reflected wave).

In such a configuration, if the distance between the transmitting source 12 and the receiver 11 is denoted L, the distance between the source 12 and the target 13 $R_T$ and the distance between the target and the receiver $R_R$, the location of the target 13 involves measuring the delay between the forward and reflected waves and determining from this delay, by any known appropriate method, the distance $R_b$ traveled by the reflected wave, defined by:

$$R_b = R_T + R_R$$

Figure 2:
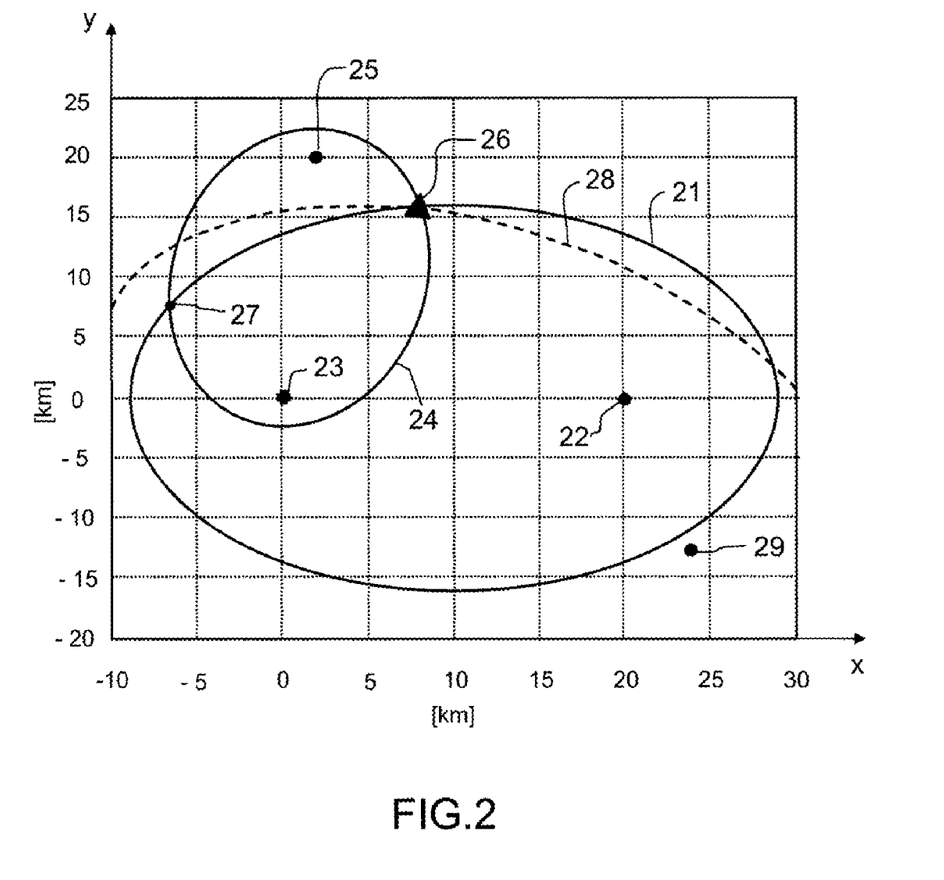

The target 13 is then located as illustrated by the curve 21 of FIG. 2 on an ambiguity ellipse, the foci 22 and 23 of which are the position of the transmitting source 12 and that of the receiver 11, and the major axis (semi-major axis) of which has the length $R_b/2$.

Consequently if a Cartesian frame of reference xOy is defined that is centered on the middle of the line segment $[R_x, T_x]$ 14 linking the source 12 and the receiver 11, and the vector $\overrightarrow{Ox}$ of which is collinear to the vector $\overrightarrow{R_x T_x}$, the equation of this location ellipse 21 in the frame of reference xOy is expressed by the following equation:

$$\frac{x^2}{a^2} + \frac{y^2}{b^2} = 1 \qquad [1]$$

with:

$$a = R_b/2$$

and $b = \sqrt{a^2 - L^2/4}$

To refine the location of the target 13, it is obviously necessary to have a number of transmission sources. That way, for one and the same target 13, a location ellipse can be associated with each source, the intersections of these ellipses defining the possible positions of the source to be located. The curves 21 and 24 of FIG. 2 illustrate the results obtained with a "2D two-transmitter" configuration from which two location ellipses are obtained, the foci 22, 23 and 25 of which are respectively the receiver and the first source for the ellipse 21, and the receiver and the second source for the ellipse 24. The set of the possible places of location of the target 13 then includes the two points of intersection 26 and 27 of the two curves.

Consequently, to determine the position of the target 13 without ambiguity, it is necessary to have at least one additional transmitting source ("2D multiple-transmitter" configuration), the intersection of the three location ellipses 21, 24 and 28 defining a single common point, the point 26 for example, on which the target 13 is situated.

Figure 3:
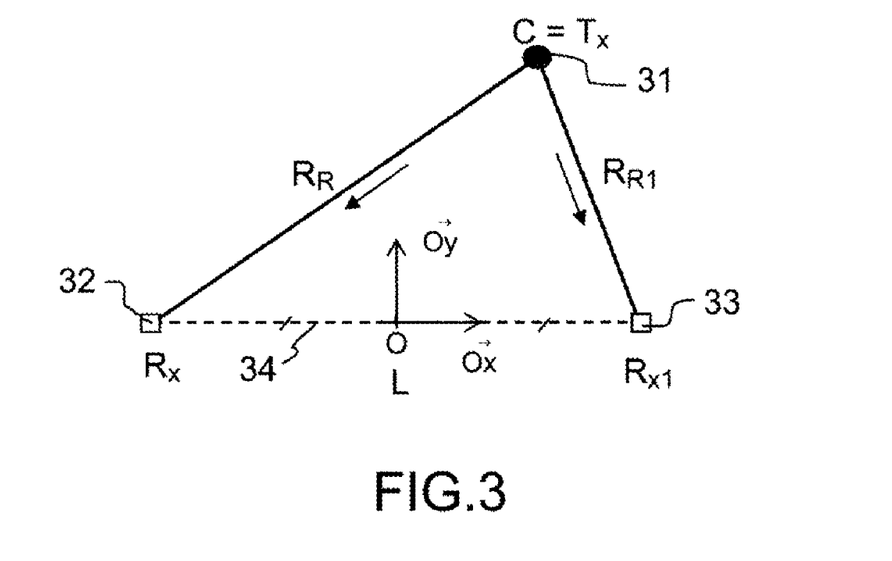

Interest is then focused on FIG. 3 which schematically shows the ideal operating principle of the TDOA location mode. In the interest of clarity of the explanation, the model illustrated here is, as for the TOA mode presentation, a two-dimensional model corresponding to the analysis of the signals obtained from a transmitting target 31 and received by two receivers 32 and 33 distant from each other, a reference receiver, called main receiver, and a so-called secondary receiver, synchronized on the reference receiver (2D single secondary receiver model).

As illustrated by FIG. 3, this "secondary single-receiver" operating mode involves a transmitting target 31 (transmitter) that is to be located, a reference receiver 32, and a secondary receiver 33. To locate the target, the time delay that exists between the instant of reception by the reference receiver of the wave transmitted by the target 31 and the instant of reception of this same wave by the secondary receiver 33 is then analyzed.

In such a configuration, if the distance between the two receivers 32 and 33 is denoted L, the distance between the transmitting target 31 and reference receiver 32 is denoted $R_R$ and the distance between the transmitting target 31 and the secondary receiver 33 is denoted $R_{R1}$, the location of the target 31 includes measuring the delay between the waves received by the two receivers and determining from this delay, by any known appropriate method, the difference in distance traveled $R_{d1}$ defined by:

$$R_{d1} = R_{R1} - R_R$$

Figure 4:
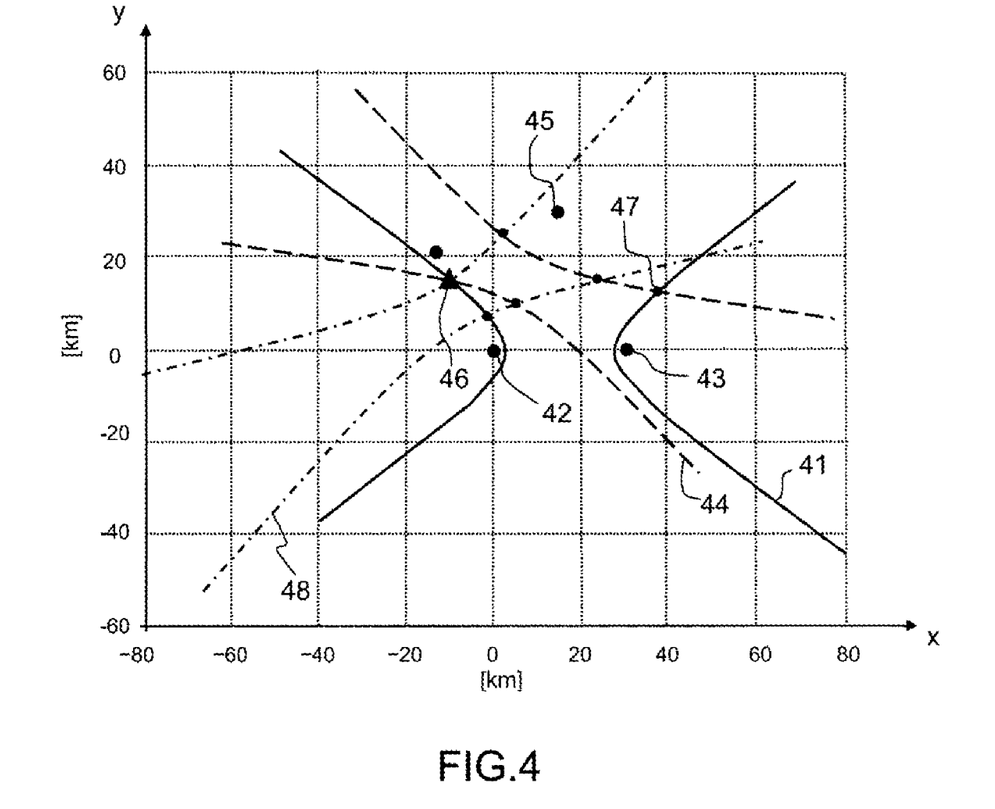

The target 31 is then located as illustrated by the curve 41 of FIG. 4 on a hyperbola having foci 42 and 43 which are the position of the reference receiver and that of the secondary receiver and for which the distance between peaks has the value $R_{d1}/2$.

Consequently, if a Cartesian frame of reference xOy is defined that is centered on the middle of the line segment $[R_x, R_{x1}]$ 34 linking the reference receiver 32 and the secondary receiver 33, and the vector $\overrightarrow{Ox}$ of which is collinear to the vector $\overrightarrow{R_x R_{x1}}$, the equation for this location hyperbola 41 in the frame of reference xOy is expressed:

$$\frac{x^2}{c^2} - \frac{y^2}{d^2} = 1 \qquad [2]$$

with:

$$c = R_{d1}/2$$

and $d = \sqrt{L^2/4 - c^2}$

To refine the location of the target 31, it is obviously necessary to have a number of secondary receivers. That way, for one and the same target 31, a location hyperbola can be associated with each reference receiver/secondary receiver pairing. The intersections of these hyperbolas then define the possible positions of the target. The curves 41 and 44 of FIG. 4 illustrate the results obtained with a "2D two secondary receivers" configuration from which two location hyperbola are obtained, the foci 42, 43 and 45 of which are respectively the reference receiver $R_x$ and the secondary receiver $R_{x1}$ for the hyperbola 41 and the reference receiver $R_x$ and a second secondary receiver $R_{x2}$ for the hyperbola 44. The set of possible places of location of the target 31 then includes the points of intersection 46 and 47 of the two curves. Consequently, to determine the position of the target 31 without ambiguity it is necessary to have at least one additional secondary receiver ("2D multiple secondary receivers" configuration), the intersection of the three location hyperbola 41, 44 and 48 defining a single common point, the point 46 in the example, on which the target 31 is situated.

The theoretical determination principle explained in the preceding paragraphs through a two-dimensional location ("2D" location) can naturally be extended to a location in space (i.e. in 3D location).

In TOA mode, the location ellipse in "single-transmitter" mode is replaced by an ellipsoid in space, an ellipsoid which can be represented by the following equation:

$$\frac{x^2}{a^2} + \frac{y^2}{b^2} + \frac{z^2}{b^2} = 1 \qquad [3]$$

with:

$$a = R_b/2$$

and $b = \sqrt{a^2 - L^2/4}$

Similarly, in TDOA mode, the location hyperbola in "single secondary receiver" mode is replaced by a hyperboloid in space, a hyperboloid which can be represented by:

$$\frac{x^2}{c^2} - \frac{y^2}{d^2} - \frac{z^2}{d^2} = 1 \quad [4]$$

with:

$c = R_{d1}/2$ and $d = \sqrt{L^2/4 - c^2}$.

Figure 5:
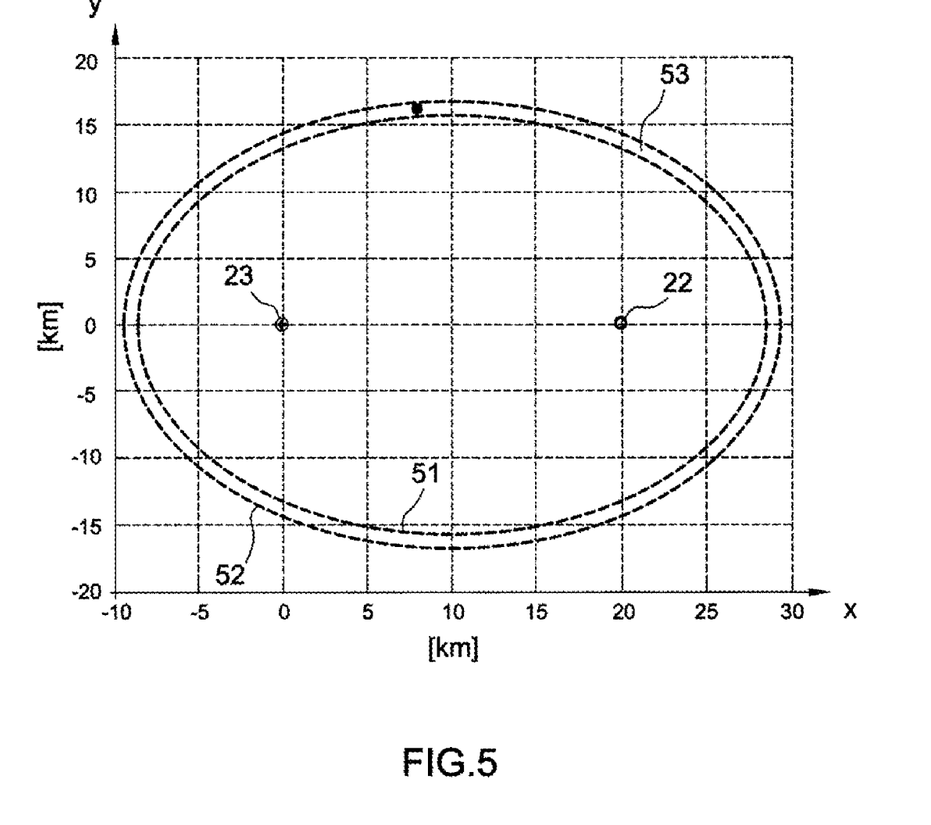
Figure 6:
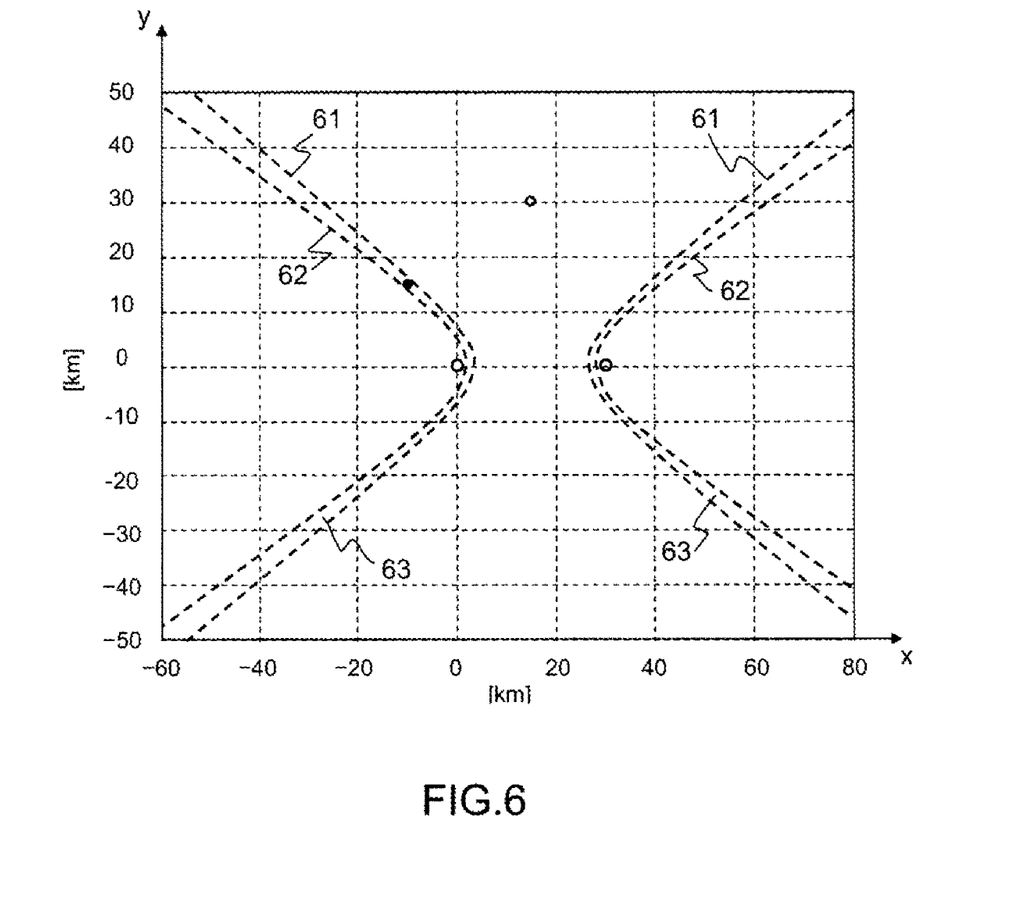

Interest is now focused on FIGS. 5 and 6 which illustrate, through simple location scenarios in TOA 2D mode (FIG. 5) and in TDOA 2D mode (FIG. 6), the problem raised by the accuracy of the real measurements obtained with the receivers.

Like any measuring device, the receivers used by the passive location systems provide measurements that are marred by a certain inaccuracy that can be assumed to be bounded. This inaccuracy means that the distance measurements performed in TOA or TDOA mode are represented, no longer by exact values, but by intervals, the size of which corresponds to the maximum measurement error. These intervals [x] are defined by the following equation:

$[x] = [x^-, x^+] = \{x \in \Re / x^- \leq x \leq x^+\}$ [5]

in which $\Re$ represents the set of real numbers.

If $\sigma_{R_b}$ represents the maximum error on the measurement $R_b$ in TOA mode, a measurement of $R_b$ with bounded error is defined by the interval:

$[R_b^-, R_b^+] := [R_b - \sigma_{R_b}, R_b + \sigma_{R_b}]$ [6]

Consequently, taking into account a bounded error on the measurement of $R_b$ in "TOA 2D" mode leads to the target concerned being located not on a curve but on a location surface delimited by two confocal ellipses 51 and 52 of respective parameters $R_b^-$ and $R_b^+$, such as that illustrated in FIG. 5. This surface 53 can be described by the following parametrical form:

$$\left\{ (x, y) \in \mathcal{R}^2 \,\middle|\, 1 \in \frac{x^2}{[a]^2} + \frac{y^2}{[b]^2} \right\} \quad [7]$$

in which:

$[a] = [R_b]/2$ and $[b] = \sqrt{[a]^2 - L^2/4}$ are evaluated by applying the interval computation rules.

Similarly, if a location is performed in space ("TOA 3D"), the taking into account of the bounded errors of the measurement of $R_b$ leads to the location of the target concerned in a volume defined by two confocal ellipsoids, a volume that can be described by the following parametrical form:

$$\left\{ (x, y, z) \in \mathcal{R}^3 \,\middle|\, 1 \in \frac{x^2}{[a]^2} + \frac{y^2}{[b]^2} + \frac{z^2}{[b]^2} \right\} \quad [8]$$

As for the TOA mode, the taking into account of a bounded error on the measurement of $R_{d1}$ in "TDOA 2D" mode leads to the location of the target concerned not on a curve but on a location surface delimited by two confocal hyperbolas 61 and 62 of respective parameters $R_{d1}^-$ and $R_{d1}^+$ defined by the interval $[R_{d1}^-, R_{d1}^+] := [R_{d1} - \sigma_{R_{d1}}, R_{d1} + \sigma_{R_{d1}}]$, such as that illustrated in FIG. 6. This surface 63 can be described by the following parametrical form:

$$\left\{ (x, y, z) \in \mathcal{R}^2 \,\middle|\, 1 \in \frac{x^2}{[c]^2} - \frac{y^2}{[d]^2} \right\} \quad [9]$$

with:

$[c] = [R_{d1}]/2$ and $[d] = \sqrt{L^2/4 - [c]^2}$

In the case of a location in space ("TDOA 3D"), the taking into account of the bounded errors on the measurement of $R_{d1}$ leads to the location of the target concerned in a volume defined by two confocal hyperboloids, a volume that can be described, in a similar manner, by the following parametrical form:

$$\left\{ (x, y, z) \in \mathcal{R}^3 \,\middle|\, 1 \in \frac{x^2}{[c]^2} - \frac{y^2}{[d]^2} - \frac{z^2}{[d]^2} \right\} \quad [10]$$

Figure 7:
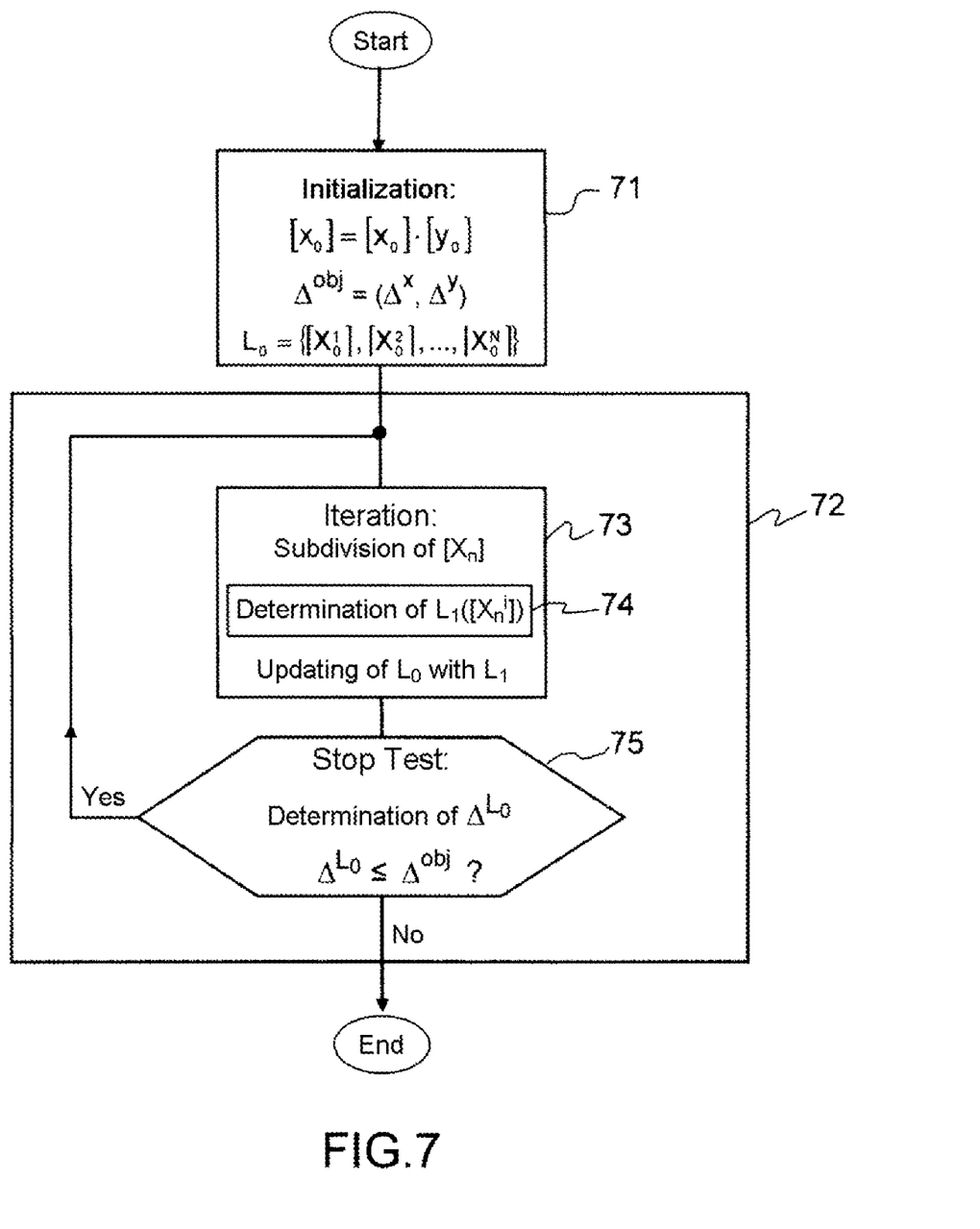

Interest is now focused on FIG. 7 which schematically shows the principle of the method according to one or more embodiments of the invention. In order to make the explanation of the operating principle of the method according to the invention clearer, this principle is described here in detail for the particular case of the search for an area of a location by means of location systems of "single-transmitter" type (location in TOA mode) or "single secondary receiver" type (location in TDOA mode).

The basic principle of the method involves a progressive refining of the location area. It includes subdividing the space that is to be analyzed (i.e., the initial search block $[x_0] \times [y_0]$) into adjoining subblocks in which the presence of a target is evaluated by means of an ad hoc criterion. The subblocks in which the presence of a target is confirmed are in turn subdivided and the others are rejected. The resulting iterative process is repeated as long as the presence of a target is confirmed in the blocks currently being analyzed and a stop criterion (corresponding to a block width objective) is not reached.

To this end, the method according to one or more embodiments of the invention includes a number of steps:

an initialization step 71,
an iterative calculation step 72.

The initialization step 71 includes defining an initial block, $[X_0]$, corresponding to an a priori search space. In 2D mode, the following thus applies:

$[X_0] = [x_0] \times [y_0]$, and and in 3D mode, the following applies:

$[X_0] = [x_0] \times [y_0] \times [z_0]$.

The step 71 also involves initializing a list $L_0$, of a size that varies during the implementation of the method, including the list of blocks to be studied. The content of $L_0$ is initialized with $[X_0]$.

The step 71 then includes defining a stop criterion for the method. This stop criterion is given here by the "objective" resolution $\Delta^{obj}$ with which it is desired to ultimately characterize the location area. This resolution is naturally limited by the accuracy of the measurements supplied by the receivers, but it can be arbitrarily set within this limit. In 2D location mode, it is perhaps defined in a coordinate system xOy by $\Delta^{obj}=(\Delta_x^{obj},\Delta_y^{obj})$.

The step 71 is followed by a step 72 carrying out an iterative processing operation that includes two nested processing loops, a main loop 73 and a secondary loop 74.

The main loop 73 includes updating the list $L_0$ established on initialization with the results of the processing carried out by the second loop. Thus, on each iteration i of the main loop, there is a re-updated list $L_0$ available, denoted $L_0^i$.

On each iteration, each block $\lfloor X_{0,k}^i \rfloor = L_0^i(k)$ forming the list $L_0^i$ is subdivided into N adjoining subblocks (N=4 in 2D mode, N=8 in 3D mode) and grouped together in a list $L_1$.

As for the secondary loop 74, this includes eliminating from $L_1$, the blocks that are incompatible with the location area being sought (that is, the blocks that do not validate the criterion).

Consequently, the element $\lfloor X_{0,k}^i \rfloor$ of $L_0^i$ is replaced, in $L_0^i$, by the list $L_1$.

According to one or more embodiments of the invention, the method is chosen to determine whether a subblock $[X^j]$ includes a portion of the location area includes determining whether one or more points of the subblock belong to that area.

To do this in the "single-transmitter" or "single secondary receiver" systems, simply the quantity $J([X^j])$ is considered, which is defined according to the location mode concerned by:

$$\text{-in "TOA 2D" mode: } J([X^j]) = \left[\frac{[x^j]^2}{[a]^2} + \frac{[y^j]^2}{[b]^2} - 1\right] \quad [11]$$

$$\text{-in "TOA 3D" mode: } J([X^j]) = \left[\frac{[x^j]^2}{[a]^2} + \frac{[y^j]^2}{[b]^2} + \frac{[z^j]^2}{[b]^2} - 1\right] \quad [12]$$

$$\text{-in "TDOA 2D" mode: } J([X^j]) = \left[\frac{[x^j]^2}{[c]^2} - \frac{[y^j]^2}{[d]^2} - 1\right] \quad [13]$$

$$\text{-in "TDOA 3D" mode: } J([X^j]) = \left[\frac{[x^j]^2}{[c]^2} - \frac{[y^j]^2}{[d]^2} - \frac{[z^j]^2}{[d]^2} - 1\right] \quad [14]$$

with $[X^j]=[x^j]\times[y^j]$ for the "2D" modes,
and $[X^j]=[x^j]\times[y^j]\times[z^j]$ for the "3D" modes.

Therefore, to verify if at least one point of a block $[X^j]$ belongs to the location area, it is sufficient, according to one or more embodiments of the invention, to check whether:

$$0 \in J([X^j]).$$

The main loop is intrinsically an endless loop for which it is necessary to determine a stop condition and an operation to test for the appearance of this stop condition. According to one or more embodiments of the invention, this stop condition is initialized in the step 71 and relates to the resolution $\Delta^{obj}$ with which it is desired to define the location area. Thus, the main loop 73 includes a test operation 75 executed at the end of processing on each iteration i. This condition is defined by the following equation:

$$\Delta^{L_0^i(1)} \leq \Delta^{obj} \equiv \begin{cases} \Delta_x^{L_0^i(1)} \leq \Delta_x^{obj} \\ \text{and} \\ \Delta_y^{L_0^i(1)} \leq \Delta_y^{obj} \end{cases} \quad [11]$$

in which $\Delta^{L_0^i(1)}$ represents the resolution of the first block forming the list $L_0^i$, each block of the list having an identical resolution at this stage.

Thus, as long as the condition of the equation [11] is found to be verified, the iterative calculation step 72 is repeated. The iteration stops only when the desired resolution is reached.

Thus, when applied to a two-dimensional TOA or TDOA location processing operation, and for an iterative subdivision of each block into P=4 subblocks, the method according to one or more embodiments of the invention can be described by the following sequence of actions:

1. Definition of the initial size of an analysis cell (block):

$[X_0]=[x_0]\times[y_0]$.

2. Initialization of the list $L_0$ of the analyzed blocks: $L_0^0$.
3. Definition of the stop criterion: $\Delta^{obj}=(\Delta_x^{obj},\Delta_y^{obj})$.
4. /beginning of main loop/: (Formation of $L_0^i$)
5. For n varying from 1 to the size of the list $L_0^{i-1}$
6. subdivision of each block n into P=4 adjoining subblocks:

$[X_n^1]=[x^-,(x^-+x^+)/2]\cdot[y^-,(y^-+y^+)/2]$ $[X_n^2]=[x^-,(x^-+x^+)/2]\cdot[(y^-+y^+)/2,y^+]$ $[X_n^3]=[(x^-+x^+)/2,x^+]\cdot[y^-,(y^-+y^+)/2]$ $[X_n^4]=[(x^-+x^+)/2,x^-]\cdot[(y^-+y^+)/2,y^+]$ 7. creation of the list $L_1^n=\{[X_n^1], [X_n^2], [X_n^3], [X_n^4]\}$
8. /beginning of secondary loop/
9. For j varying from 1 to 4
10. Elimination of the subblocks $[X_n^j]$, that do not satisfying the selection criterion $0 \in J([X_n^j])$: Formation of $L_1^n$.
11. if $L_1^n$ is not empty: replacement, in $L_0^{i-1}$, of the block $[X_n]$ by the list $L_1^n$,
    if $L_1^n$ is empty: elimination of the block $[X_n]$ from the list $L_0^{i-1}$
12. /end of secondary loop/
13. /end of main loop/(Formation of $L_0^i$)
14. Calculation of the resolution of the first element of $L_0^i$:

$\Delta^{L_0^i(1)}=(x_{L_0^i(1)}^+ - x_{L_0^i(1)}^-, y_{L_0^i(1)}^+ - y_{L_0^i(1)}^-)$ 15. if $\Delta^{L_0^i(1)} \leq \Delta^{obj}$: return to /start of main loop/
    else: end of procedure
16. /end of procedure/

Figure 8:
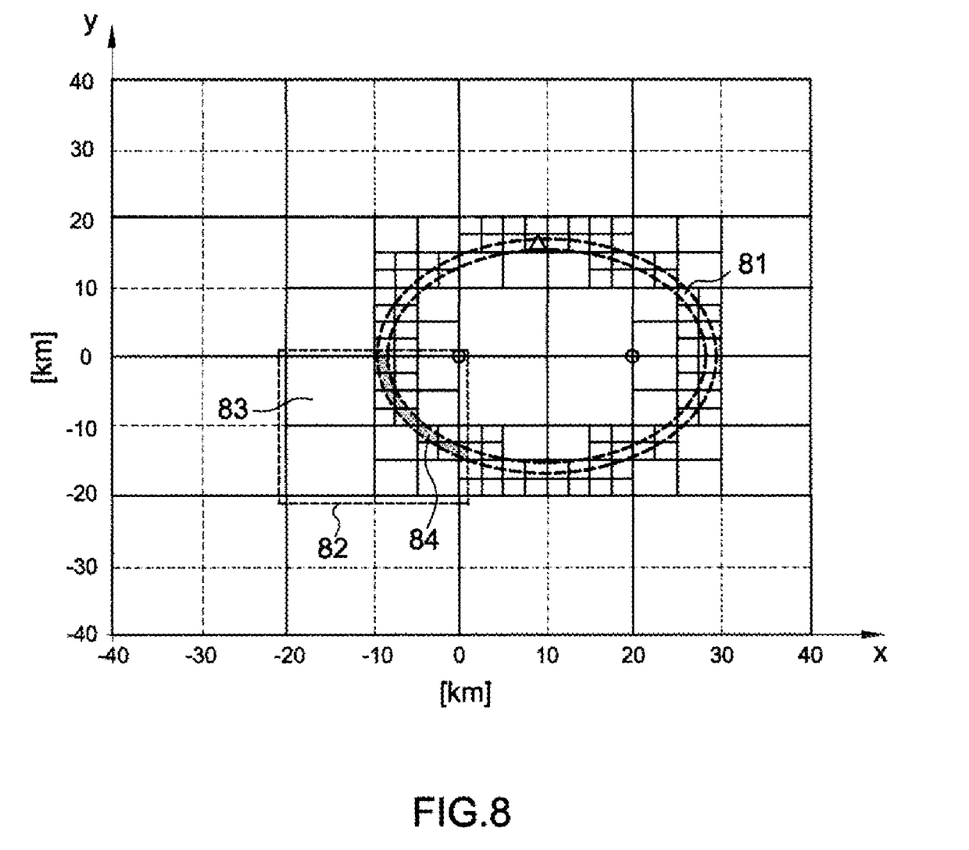
Figure 9:
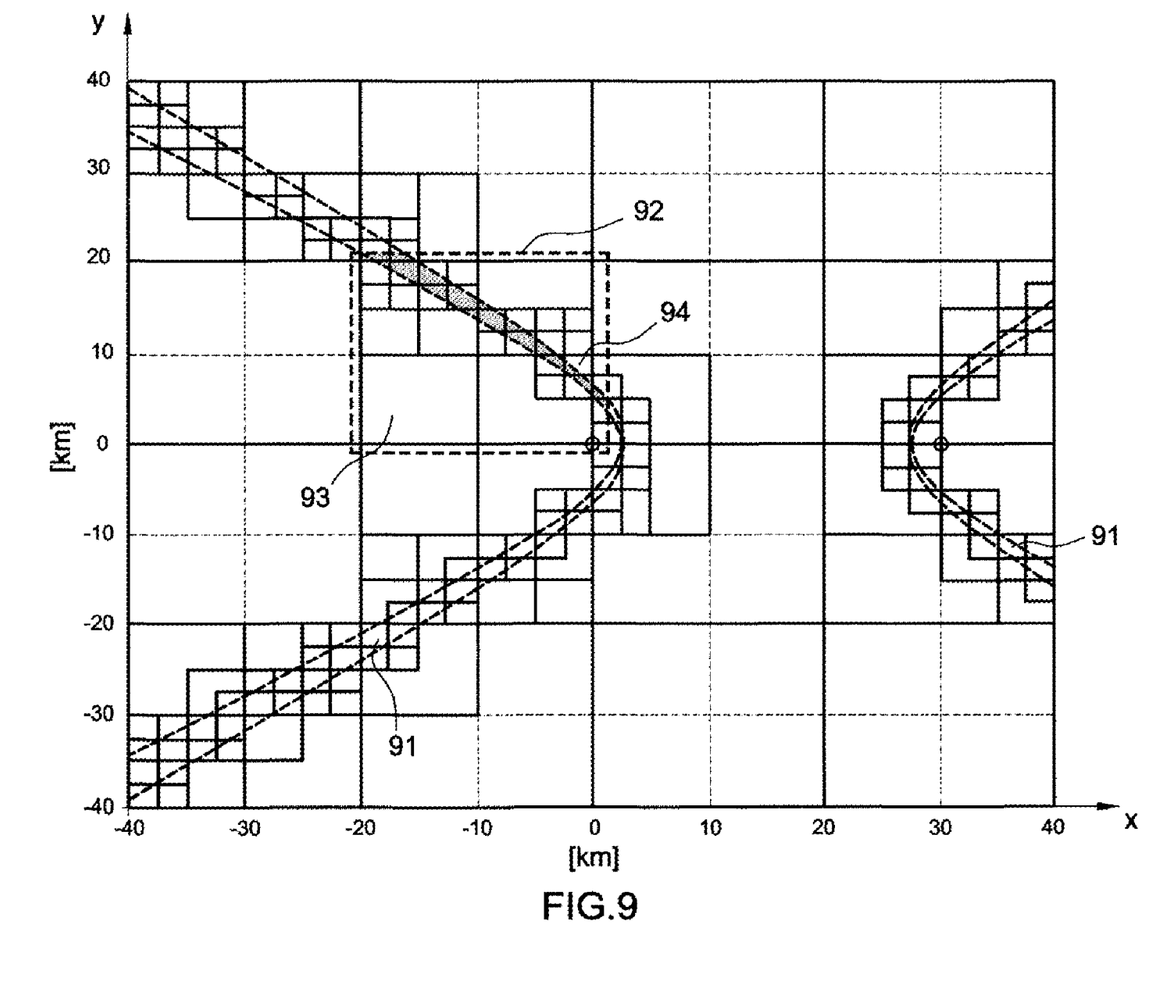

The principle of implementation of the method according to one or more embodiments of the invention can be advantageously illustrated by FIGS. 8 and 9.

FIG. 8 illustrates the implementation of the method according to one or more embodiments of the invention on a location in TOA mode, with a "2D single-transmitter" type system.

As can be seen the figure, the implementation of the method according to one or more embodiments of the invention is physically embodied in a breakdown into blocks of the space that includes the location area 81. This subdivision forms a mesh of the space, a mesh in which each cell is analyzed to determine whether or not it includes a portion of the location area. The duly formed mesh is refined iteratively. During the successive iterations, certain cells 83 formed by the division of a larger cell 82 including a portion 84 of the location area no longer include such portions. According to one or more embodiments of the invention, the process of refining these "empty" areas then ceases, which makes it possible advantageously to avoid continuing, for such cells, an analysis that is sterile and costly in computation workload and to concentrate the refining on the cells where it presents a benefit for determining as accurately as possible the location area 81. An irregular mesh is thus advantageously obtained, in which the tight mesh is only centered on the location area.

FIG. 9 illustrates in the same way the implementation of the method according to one or more embodiments of the invention on a location in TDOA mode, with a system of the "2D single secondary receiver" type. The implementation of the method according to one or more embodiments of the invention is embodied in the same way by a subdivision into blocks of the space that includes the location area 91. Areas 93 are also obtained for which the refining is not carried out and areas 94 for which it is continued.

The method according to one or more embodiments of the invention, detailed in the preceding paragraphs for the particular case of systems of "TOA single-transmitter" or "TDOA single secondary receiver" types can obviously be applied to the more complex location systems of "TOA multiple transmitter" or "TDOA multiple secondary receiver" types in 2D or in 3D. These types of systems can be used, by considering the intersections of the different location areas, to refine the location of the target being sought by limiting the location area to the intersections of the different areas obtained. Regarding these modes, the method according to one or more embodiments of the invention, as described in the foregoing, remains applicable in principle. Only the criterion for selection of a subblock used in the secondary loop of the step 72 of the iterative processing operation is modified. Thus, if the system includes a total number N of transmitters (location in "TOA multiple transmitter" mode) or receivers (location in "TDOA multiple secondary receiver" mode), a subblock [X] will be selected if the following equation is verified:

$$A = \sum_{j=1}^{N} a_j = N \quad [12]$$

in which each element $a_j$ represents the result of the calculation of a selection criterion relating to a pairing (receiver $R_x$, transmitter $T_x^i$) (TOA location mode) or (reference receiver $R_x$, secondary receiver $R_x^i$) (TDOA location mode).

The elements $a_j$ are defined by the following equations:

$$a_1 = \begin{cases} 1 & \text{if } 0 \in J_1([X]) \\ 0 & \text{else} \end{cases}$$

...

$$a_N = \begin{cases} 1 & \text{if } 0 \in J_N([X]) \\ 0 & \text{else} \end{cases}$$

and in which $J_j([X])$ represents, for each individual system $(R_x, T_{xj})$ or $(R_x, R_{xj})$, the quantity $J([X])$ defined previously ([11, 12, 13, 14]).

Figure 10:
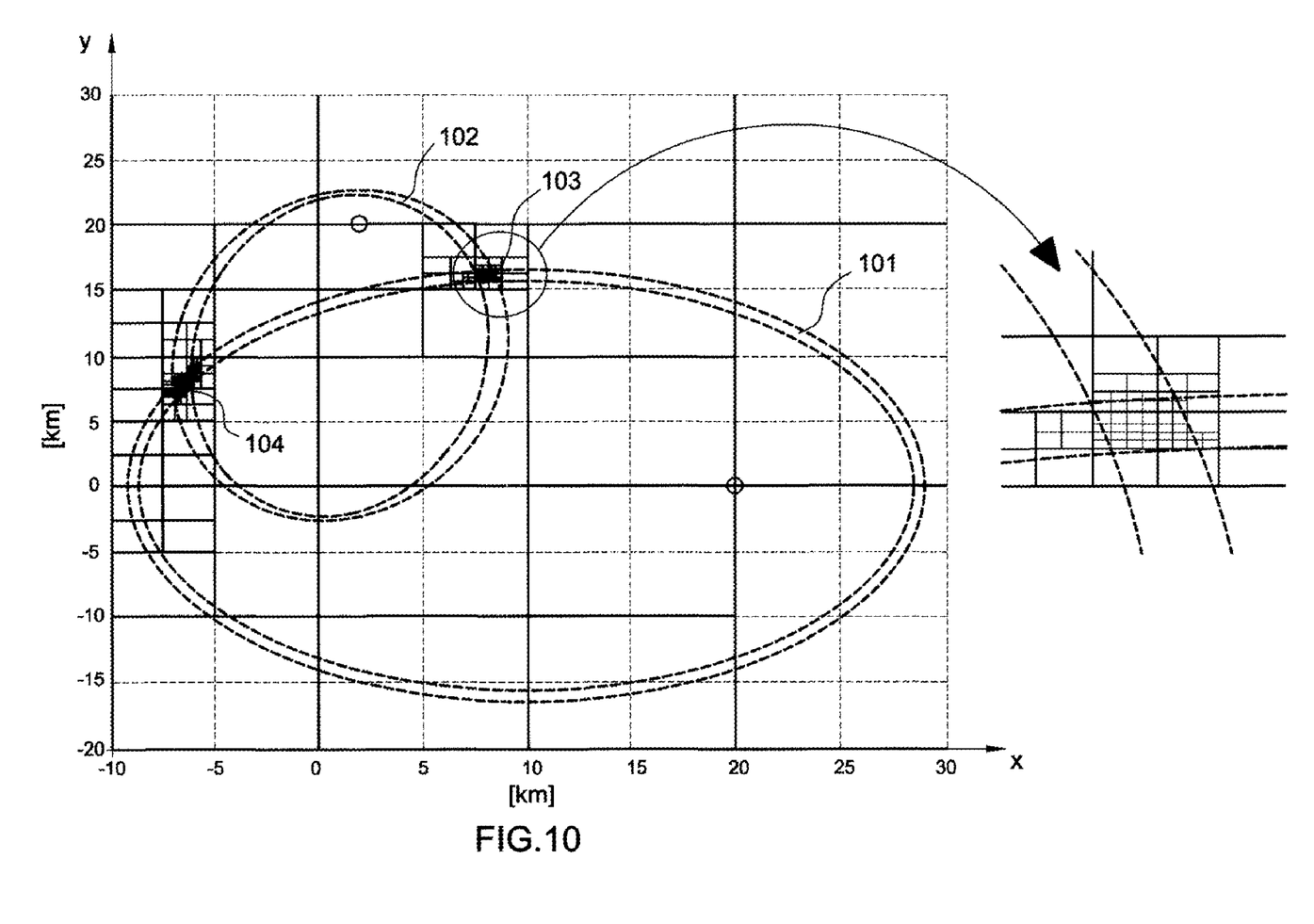

The FIG. 10 illustrate the implementation of the method in the case of a location system of "TOA two-transmitters" type. As can be seen in the figure, the mesh produced using the method according to one or more embodiments of the invention is once again an irregular mesh for which the tight cells, of greater resolution, are located on the location areas 101 and 102 defined by each individual system, and more specifically on the portions 103 and 104 of these areas that constitute intersections and that represents the possible location areas of the target.

Figure 11:
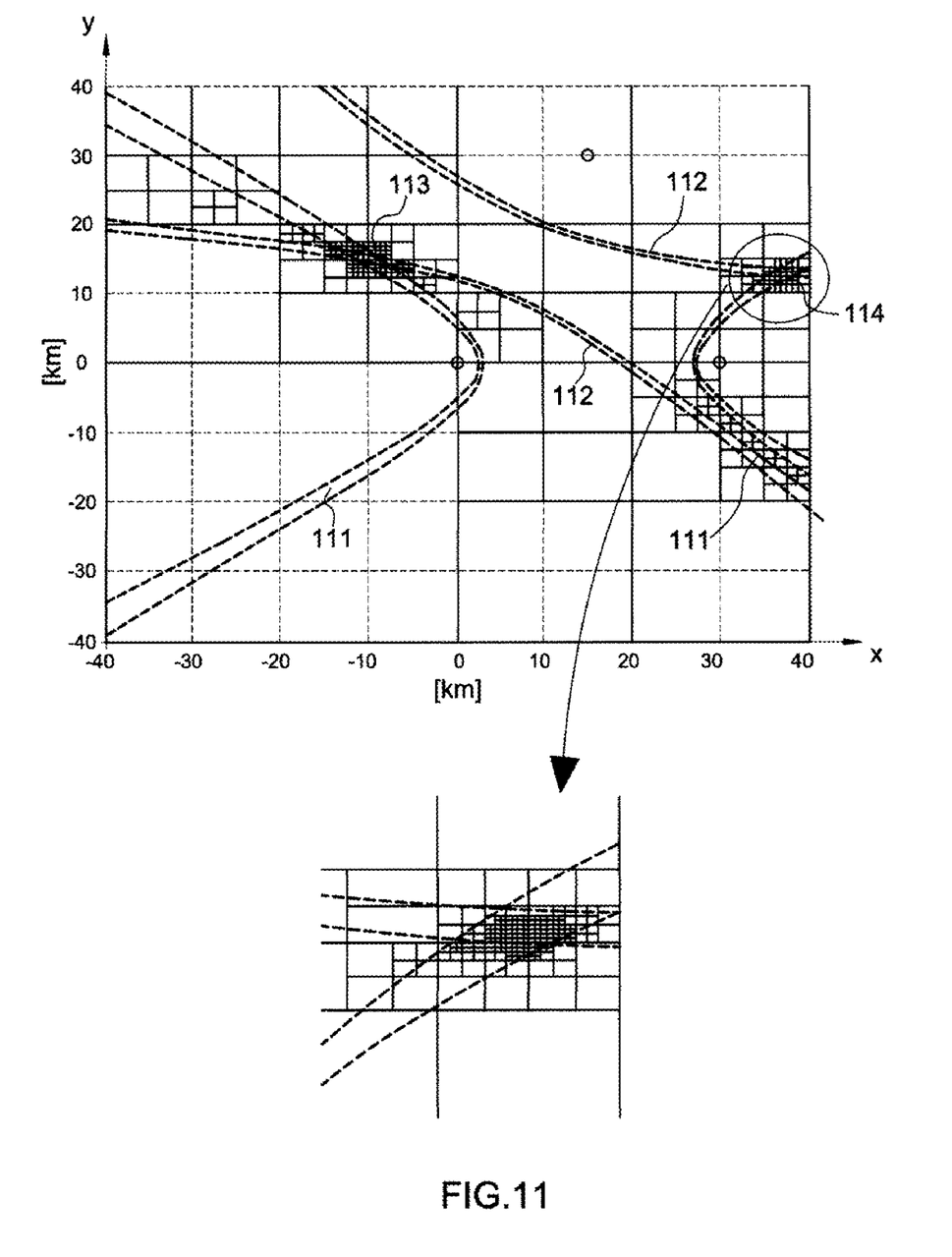

Turning to FIG. 11, this illustrates in a similar manner the implementation of the method in the case of a location system of the "TDOA two secondary receivers" type. As for the preceding case, it can be seen that the mesh produced by the method according to one or more embodiments of the invention includes tight cells only in the places of the areas 113 and 114 representing the intersections of the location areas 111 and 112 defined by each individual system.

Since no system can be perfect, a certain tolerance can be accepted as to the number of basic criteria $J_n([X])$ that are simultaneously satisfied. This tolerance is reflected by an acceptance of an interval [X] if $A \geq M$ (with $M \leq N$).

The present invention extends, by adapting the basic criteria $J_n([X])$:

to the problems of multiple TOA location: use of a family of basic criteria combining the basic criteria associated with each of the TOA problems (this situation occurs when trying to locate a target by analyzing two receivers that are not co-located operating in TOA mode).

to the problems of multiple-TDOA location: use of a family of basic criteria combining the basic criteria associated with each of the TDOA sub-problems.

to the problems of mixed TOA/TDOA location: use of a family of basic criteria combining the basic criteria associated with each of the TOA and TDOA problems.

The invention claimed is:

1. A method of passively locating a target in TOA or TDOA mode comprising the steps of:

subdividing into blocks a space in which a location area is situated; and iteratively performing on the blocks, until a predetermined criterion is obtained, the steps of:

searching within each block for a presence of at least one point belonging to the location area;

excluding from the blocks any blocks that do not contain a point that belongs to the location area;

resubdividing into subblocks any blocks that contain a point that belongs to the location area;

replacing the blocks by the subblocks, wherein each iteration increases an accuracy of defining the location area, and the method further comprises the steps of:

forming a current selection from a first block that corresponds to an a priori search space;

forming a current list from the first block;

iteratively performing the steps of:

subdividing each block of a current list into a first, second, third, and fourth adjoining subblocks;

searching the first, second, third, and fourth subblocks for at least one point forming part of the location area, to produce searched subblocks;

selecting the searched subblocks having at least one point forming part of the location area, to produce selected subblocks;

updating the current list to obtain an updated list, by performing the steps of:

deleting blocks that have no selected subblocks; and replacing blocks not deleted by the first, second, third, and fourth subblocks to form an updated current list, wherein:

the iteratively performed steps comprise a test to compare a resolution of the blocks that constitute the updated current list; and the iteratively performed steps stop when the resolution is greater than a desired resolution.

2. The method as claimed in claim 1, wherein in a TOA 2D single transmitter location mode, a subblock is selected if the subblock satisfies a criterion determined in accordance with the following relationship:

$$0 \in J([X^j]) \text{ with } J([X^j]) = \left[\frac{[x^j]^2}{[a]^2} + \frac{[y^j]^2}{[b]^2} - 1\right],$$

wherein:
$a = R_b/2$;
$b = \sqrt{a^2 - L^2/4}$;
L is a length from a transmitter to a receiver;
$R_b$ is a sum of a length from the transmitter to the target, and a length from the target to the receiver;
$x^j$ and $y^j$ are Cartesian coordinates of a subblock j, for a frame of reference centered on a middle of a line segment linking the source and the receiver; and
$[X^j]$ is a j-th subblock of block $[X]$.

3. The method as claimed in claim 1, wherein in a TDOA 2D single secondary receiver location mode, a subblock is selected if the subblock satisfies a criterion determined in accordance with the following relationship:

$$0 \in J([X^j]) \text{ with } J([X^j]) = \left[\frac{[x^j]^2}{[c]^2} - \frac{[y^j]^2}{[d]^2} - 1\right],$$

wherein:
$c = R_{d1}/2$;
$d = \sqrt{L^2/4 - c^2}$;
L is a length from a first receiver to a second receiver;
$R_{d1}$ is a difference between a length from the transmitter to the second receiver, and a length from the transmitter to the first receiver;
$x^j$ and $y^j$ are Cartesian coordinates of a subblock j, for a frame of reference centered on a middle of a line segment linking the first receiver and the second receiver; and
$[X^j]$ is a j-th subblock of block $[X]$.

4. The method as claimed in claim 1, wherein in a TOA 3D single transmitter location mode, a subblock is selected if the subblock satisfies a criterion determined in accordance with the following relationship:

$$0 \in J([X^j]) \text{ with } J([X^j]) = \left[\frac{[x^j]^2}{[a]^2} + \frac{[y^j]^2}{[b]^2} + \frac{[z^j]^2}{[b]^2} - 1\right]$$

wherein:
$a = R_b/2$;
$b = \sqrt{a^2 - L^2/4}$;
L is a length from a transmitter to a receiver;
$R_b$ is a sum of a length from the transmitter to the target, and a length from the target to the receiver;
$x^j$, $y^j$ and $z^j$ are Cartesian coordinates of a subblock j, for a frame of reference centered on a middle of a line segment linking the source and the receiver; and
$[X^j]$ is a j-th subblock of block $[X]$.

5. The method as claimed in claim 1, wherein in a TDOA 3D single secondary receiver location mode, a subblock is selected if a point of the subblock satisfies a criterion determined in accordance with the following relationship:

$$0 \in J([X^j]) \text{ with } J([X^j]) = \left[\frac{[x^j]^2}{[c]^2} - \frac{[y^j]^2}{[d]^2} - \frac{[z^j]^2}{[d^2]} - 1\right],$$

wherein:
$c = R_{d1}/2$;
$d = \sqrt{L^2/4 - c^2}$;
L is a length from a first receiver to a second receiver;
$Ra_{d1}$ is a difference between a length from the transmitter to the second receiver, and a length from the transmitter to the first receiver;
$x^j$, $y^j$ and $z^j$ are Cartesian coordinates of a subblock j, for a frame of reference centered on a middle of a line segment linking the first receiver and the second receiver; and
$[X^j]$ is a j-th subblock of block $[X]$.

6. The method as claimed in claim 1, wherein in a TOA multiple transmitters location mode or in a TDOA multiple secondary receivers location mode, a subblock is selected if the subblock satisfies a criterion determined in accordance with the following relationship;

$$A = \sum_{j=1}^{N} a_j = N$$

wherein:
N is a number of transmitters or secondary receivers that constitute the TOA or TDOA location system concerned, respectively; and
the terms $a_j$ are determined in accordance with the following relationships:

$$a_1 = \begin{cases} 1 \text{ if } 0 \in J_1([X]) \\ 0 \text{ else}; \end{cases}$$

$$a_2 = \begin{cases} 1 \text{ if } 0 \in J_2([X]) \\ 0 \text{ else}; \end{cases}$$

...

$$a_N = \begin{cases} 1 \text{ if } 0 \in J_N([X]) \\ 0 \text{ else}, \end{cases}$$

wherein:
for each individual single-transmitter or single secondary receiver system, a quantity $J_j([X])$ is determined in accordance with the following relationships:

$$J([X^j]) = \left[\frac{[x^j]^2}{[a]^2} + \frac{[y^j]^2}{[b]^2} - 1\right] \text{ in "}TOA\ 2D\text{" mode};$$

$$J([X^j]) = \left[\frac{[x^j]^2}{[a]^2} + \frac{[y^j]^2}{[b]^2} + \frac{[z^j]^2}{[b]^2} - 1\right] \text{ in "}TOA\ 3D\text{" mode};$$

$$J([X^j]) = \left[\frac{[x^j]^2}{[c]^2} - \frac{[y^j]^2}{[d]^2} - 1\right] \text{ in "}TDOA\ 2D\text{" mode};$$

and

-continued $$J([X^j]) = \left[\frac{[x^j]^2}{[c]^2} - \frac{[y^j]^2}{[d]^2} - \frac{[z^j]^2}{[d]^2} - 1\right] \text{ in "TDOA 3D" mode,}$$

wherein:
   $a = R_b/2$;
   $b = \sqrt{a^2 - L_{TOA}^2/4}$;
   $c = R_{d1}/2$;
   $d = \sqrt{L_{TDOA}^2/4 - c^2}$;
   $L_{TOA}$ is a length from a transmitter to a first receiver;
   $L_{TDOA}$ is a length from a first receiver to a second receiver;
   $R_b$ is a sum of a length from the transmitter to the target, and a length from the target to the receiver;
   $R_{d1}$ is a difference between a length from the transmitter to the second receiver, and a length from the transmitter to the first receiver;
   $x^j$, $y^j$ and $z^j$ are Cartesian coordinates of a subblock j, for a frame of reference centered on a middle of a line segment linking the source and the receiver in TOA mode, or for a frame of reference centered on a middle of a line segment linking the first receiver and the second receiver in TDOA mode, respectively; and
   $[X^j]$ is a j-th subblock of block $[X]$.

7. The method as claimed in claim 1, wherein in a TOA multiple transmitters location mode or in TDOA multiple secondary receivers location mode, for a number N of transmitters or secondary receivers constituting the TOA or TDOA location system concerned, respectively, a subblock is selected if the subblock satisfies a criterion A determined in accordance with the following relationship:

$$A = \sum_{j=1}^{N} a_j \geq M$$

wherein:
   M is a pre-determined number, less than N, of transmitters or secondary receivers constituting the TOA or TDOA location system concerned, respectively; and
   the terms $a_j$ are determined in accordance with the following relationships:

$$a_1 = \begin{cases} 1 \text{ if } 0 \in J_1([X]) \\ 0 \text{ else;} \end{cases}$$

$$a_2 = \begin{cases} 1 \text{ if } 0 \in J_2([X]) \\ 0 \text{ else;} \end{cases}$$

...

$$a_N = \begin{cases} 1 \text{ if } 0 \in J_N([X]) \\ 0 \text{ else,} \end{cases}$$

wherein:
   for each individual single transmitter or single secondary receiver system, a quantity $J_j([X])$ is determined in accordance with the following relationships:

$$J([X^j]) = \left[\frac{[x^j]^2}{[a]^2} + \frac{[y^j]^2}{[b]^2} - 1\right] \text{ in "TOA 2D" mode;}$$

$$J([X^j]) = \left[\frac{[x^j]^2}{[a]^2} + \frac{[y^j]^2}{[b]^2} + \frac{[z^j]^2}{[b]^2} - 1\right] \text{ in "TOA 3D" mode;}$$

$$J([X^j]) = \left[\frac{[x^j]^2}{[c]^2} - \frac{[y^j]^2}{[d]^2} - 1\right] \text{ in "TDOA 2D" mode;}$$

and $$J([X^j]) = \left[\frac{[x^j]^2}{[c]^2} - \frac{[y^j]^2}{[d]^2} - \frac{[z^j]^2}{[d]^2} - 1\right] \text{ in "TDOA 3D" mode,}$$

wherein:
   $a = R_b/2$;
   $b = \sqrt{a^2 - L_{TOA}^2/4}$;
   $c = R_{d1}/2$;
   $d = \sqrt{L_{TDOA}^2/4 - c^2}$;
   $L_{TOA}$ is a length from a transmitter to a first receiver;
   $L_{TDOA}$ is a length from a first receiver to a second receiver;
   $R_b$ is a sum of a length from the transmitter to the target, and a length from the target to the receiver;
   $R_{d1}$ is a difference between a length from the transmitter to the second receiver, and a length from the transmitter to the first receiver;
   $x^j$, $y^j$ and $z^j$ are Cartesian coordinates of a subblock j, for a frame of reference centered on a middle of a line segment linking the source and the receiver in TOA mode, or for a frame of reference centered on a middle of a line segment linking the first receiver and the second receiver in TDOA mode, respectively; and
   $[X^j]$ is a j-th subblock of block $[X]$.

8. The method as claimed in claim 6, wherein the method is used for the passive location of the target by a global system comprising individual single transmitter and single secondary receiver systems and operating in a mixed TOA/TDOA mode.

9. The method as claimed in claim 7, wherein the method is used for the passive location of the target by a global system comprising individual single transmitter and single secondary receiver systems and operating in a mixed TOA/TDOA mode.

\* \* \* \* \*